(12) United States Patent
Morimoto et al.

(10) Patent No.: US 8,802,325 B2
(45) Date of Patent: Aug. 12, 2014

(54) FUEL CELL STACK HAVING TIGHTENING MEMBERS

(75) Inventors: Go Morimoto, Utsunomiya (JP); Takashi Kuwayama, Utsunomiya (JP); Hiroyuki Tanaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 263 days.

(21) Appl. No.: 13/191,158

(22) Filed: Jul. 26, 2011

(65) Prior Publication Data

US 2012/0021326 A1    Jan. 26, 2012

(30) Foreign Application Priority Data

Jul. 26, 2010   (JP) ................................. 2010-166650
Aug. 13, 2010  (JP) ................................. 2010-181334

(51) Int. Cl.
*H01M 2/08*   (2006.01)
*H01M 8/24*   (2006.01)
*H01M 8/10*   (2006.01)

(52) U.S. Cl.
CPC .............. *H01M 8/248* (2013.01); *H01M 8/249* (2013.01); *H01M 8/247* (2013.01); *H01M 2008/1095* (2013.01); *Y02E 60/50* (2013.01)
USPC ............ 429/511; 429/467; 429/469; 429/470

(58) Field of Classification Search
CPC ..... H01M 8/247; H01M 8/249; H01M 8/248; H01M 2008/1095; Y02E 60/50
USPC .......... 429/465, 467, 469, 470, 471, 508, 511
See application file for complete search history.

(56) References Cited

U.S. PATENT DOCUMENTS

| 6,218,039 | B1 * | 4/2001 | Mease et al. ................. 429/470 |
| 6,620,540 | B2 | 9/2003 | Sugita et al. |
| 2008/0199751 | A1 * | 8/2008 | Giddey et al. .................. 429/30 |
| 2008/0318114 | A1 * | 12/2008 | Lee et al. ........................ 429/34 |
| 2010/0133028 | A1 * | 6/2010 | Saito ........................ 180/65.31 |

FOREIGN PATENT DOCUMENTS

| JP | 2001-126749 | 5/2001 | |
| JP | 2002-56882 | 2/2002 | |
| JP | 2004-362940 | 12/2004 | |
| JP | 2005-142042 | * 6/2005 | ............. H01M 8/24 |
| JP | 2006-108009 | 4/2006 | |
| JP | 2008-159414 | 7/2008 | |
| JP | 2008-234985 | 10/2008 | |
| JP | 2009-70674 | 4/2009 | |

OTHER PUBLICATIONS

Japanese Office Action for Application No. 2010-181334, 3 pages, dated Aug. 20, 2013.

* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A fuel cell stack includes a stack body formed by stacking a plurality of fuel cells in a stacking direction, and first and second end plates at both ends in the stacking direction. Long sides of the first and second end plates are fixed together by a pair of tightening members. The tightening member includes a bent portion bent in a direction along a surface of the second end plate, and coupled to the pressure application adjustment device, and a wide portion having a width extended toward the first end plate.

6 Claims, 12 Drawing Sheets

FUEL CELL STACK HAVING TIGHTENING MEMBERS

CROSS-REFERENCE TO RELATED APPLICATION

This application is based upon and claims the benefit of priority from Japanese Patent Applications No. 2010-166650 filed on Jul. 26, 2010 and No. 2010-181334 filed on Aug. 13, 2010, of which the contents are incorporated herein by reference.

BACKGROUND OF THE INVENTION

1. Field of the Invention

The present invention relates to a stack body formed by stacking a plurality of fuel cells in a stacking direction and a pair of end plates provided at both ends in the stacking direction. Each of the fuel cells is formed by stacking a membrane electrode assembly and a rectangular separator. The membrane electrode assembly includes a pair of electrodes and an electrolyte membrane interposed between the pair of electrodes. Long sides of the pair of end plates are fixed together by tightening members.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit cell (power generation cell) for generating electricity. In use, generally, a predetermined number of unit cells are stacked together to form a fuel cell stack mounted in a vehicle or the like.

In this type of fuel cell stack, a suitable tightening load need to be applied in the stacking direction in order to achieve the desired power generation performance and sealing performance.

For example, as shown in FIG. 11, in a fuel cell stack disclosed in Japanese Laid-Open Patent Publication No. 2004-362940, a stack body formed by stacking a plurality of fuel cells 1001 are sandwiched between end plates 1002, 1003, and a plurality of tightening plates 1004 are provided to hold the stack body. The tightening plates 1004 contact sides of the stack body, and a bent portion 1004a is provided at least one of upper and lower positions of the stack body. The bent portion 1004a of the tightening plate 1004 is fixed to the end plates 1002, 1003 using bolts 1005 and nuts 1006.

In Japanese Laid-Open Patent Publication 2004-362940, four rectangular tightening plates 1004 are used, and bent portions 1004a as both ends of the tightening plate 1004 are fixed at the center of each side of the end plates 1002, 1003. Thus, stress can be easily concentrated at specific positions of the end plates 1002, 1003 in the tightening direction (stacking direction). In the structure, distortion or the like occurs in the end plates 1002, 1003, and the tightening force cannot be applied uniformly to the entire surface (in particular, the entire power generation surface) of the stack body.

In particular, in a fuel cell stack mounted in a vehicle, external loads (impacts) may be applied to the fuel cell stack during traveling of the vehicle or the like. Therefore, it is required to prevent positional displacement in a direction intersecting the stacking direction of the unit cells.

In this regard, for example, a fuel cell stack disclosed in Japanese Laid-Open Patent Publication No. 2009-070674 is known. As shown in FIG. 12, at one end of the fuel cell stack, an end plate 1011a is provided. An insulating plate 1012a is stacked on the end plate 1011a. A current collection plate 1013a is stacked on the insulating plate 1012a. A plurality of unit cells 1014 are stacked on the current collection plate 1013a. A current collection plate 1013b is stacked on the unit cells 1014. An insulating plate 1012b is stacked on the current collection plate 1013b. An end plate 1011b is stacked on the insulating plate 1012b. Tightening members 1015 each having a shape of rectangular column having a rectangular shape in cross section are fixed to four corners of the end plates 1011a, 1011b, so as to apply loads between the end plates 1011a, 1011b in the stacking direction.

The fuel cell stack includes four external binding members 1016a, 1016b, 1016c, and 1016d extending in the stacking direction. Recesses 1017a, 1017b, 1017c, and 1017d are formed at the center of each of the upper long side, lower long side, left short side, and the right short side of the end plates 1011a, 1011b, the insulating plates 1012a, 1012b, the current collection plates 1013a, 1013b, and the stacked unit cells 1014. The external binding members 1016a, 1016b, 1016c, and 1016d are fitted to the recesses 1017a, 1017b, 1017c, and 1017d.

In Japanese Laid-Open Patent Publication No. 2009-070674, the four tightening members 1015 are fixed between the end plates 1011a and 1011b, and the four external binding members 1016a to 1016d are fixed to the end plates 1011a, 1011b. In the structure, the number of components is significantly increased, and the cost becomes high. Further, operation of assembling the fuel cell stack becomes laborious.

SUMMARY OF THE INVENTION

The present invention has been made to solve the problems of this type, and an object the present invention is to provide a fuel cell stack small and light in weight in which a suitable external load can be applied to fuel cells reliably in a stacking direction of the fuel cells.

Further, an object of the present invention is to provide a fuel cell stack in which an external load applied to fuel cells is received reliably with simple structure and a small number of components.

The present invention relates to a fuel cell stack including a stack body formed by stacking a plurality of fuel cells in a stacking direction and a pair of end plates provided at both ends in the stacking direction. Each of the fuel cells is formed by stacking a membrane electrode assembly and a rectangular separator. The membrane electrode assembly includes a pair of electrodes, and an electrolyte membrane interposed between the pair of electrodes. Long sides of the pair of end plates are fixed together by tightening members.

In the fuel cell stack, a pressure application adjustment device capable of adjusting a tightening load applied to the stack body is provided in one of the end plates. Each of the tightening members includes one end as a bent portion provided at the one of the end plates, and the other end as a wide portion provided at the other one of the end plates. The bent portion is bent in a direction along a surface of the one of the end plates, and coupled to the pressure application adjustment device. The wide portion has a width extended toward the long side of the other of end plates.

Further, in the fuel cell stack, a protrusion or a recess is provided on each of both side surfaces of the stack body where the tightening members are provided, and the tightening member includes a fitting portion fitted to the protrusion or the recess.

In the present invention, the pressure application adjustment device is coupled to the bent portion of the tightening member. Therefore, no plate dedicated to attach the pressure application adjustment device is required. Thus, the number of components is reduced effectively, and reduction in the size and weight is achieved. The structure is simplified as well.

Further, the tightening member includes the other end as the wide portion at the other one of the end pates. Thus, the wide portion and the end plate are coupled in a relatively wide range in the longitudinal direction of the end plate, and stress concentration in the end plate can be prevented suitably.

Accordingly, with compact and lightweight structure, the optimum tight load can be reliably applied to the fuel cells in the stacking direction.

Further, in the present invention, the tightening members for tightening long sides of the pair of end plates together include fitting portions fitted to the protrusions or the recesses extending through both side surfaces of the stack body. In the structure, the tightening members receive the load in the stacking direction, and the fitting portions receive the load in a direction along the power generation surface, intersecting the stacking direction.

Further, the number of components is reduced effectively. With simple structure, the external load applied to the fuel cells is received reliably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
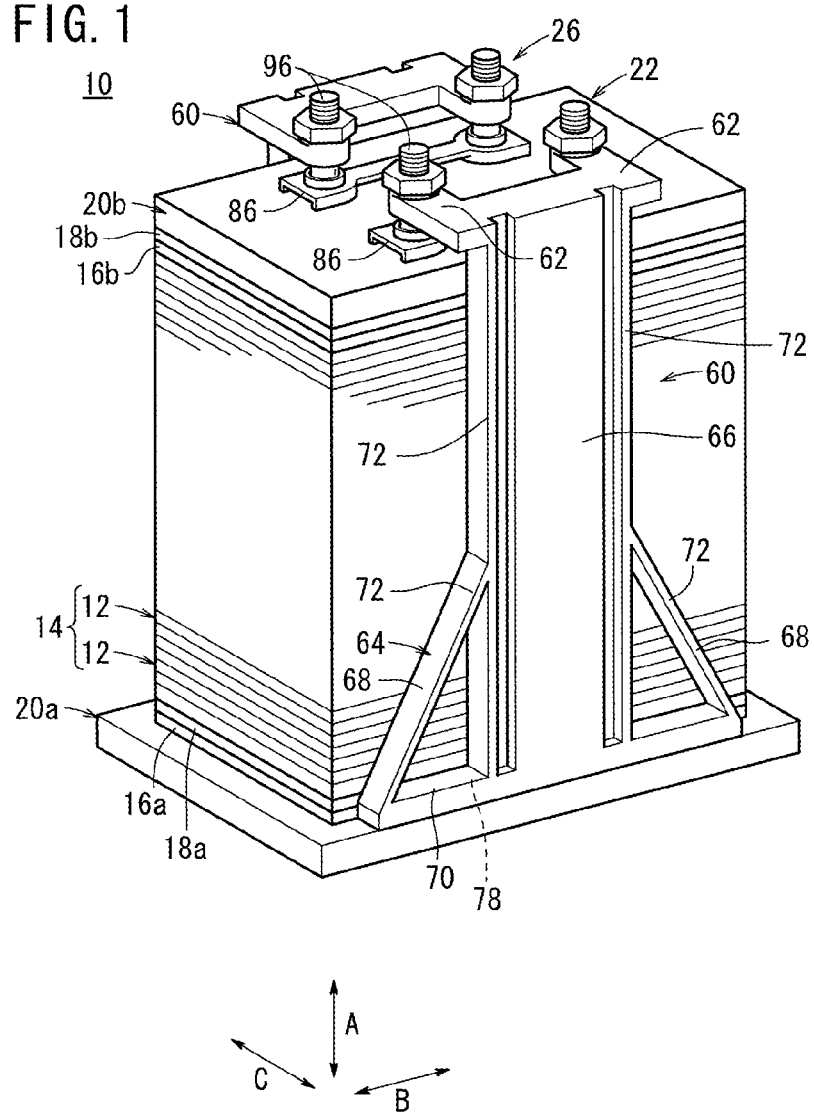
FIG. 1 is a perspective view schematically showing a fuel cell stack according to a first embodiment of the present invention.
Figure 2:
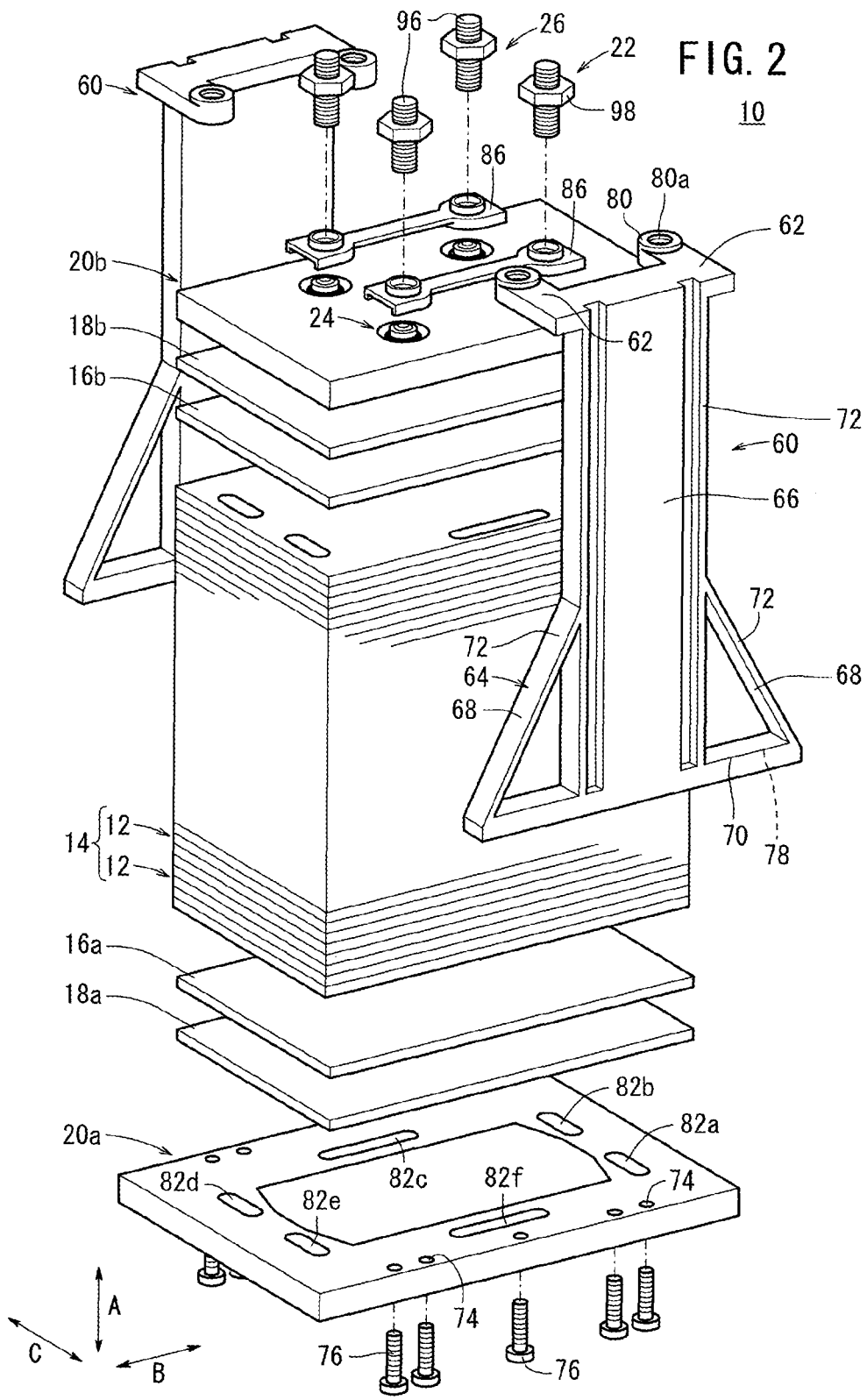
FIG. 2 is an exploded perspective view showing main components of a fuel cell of the fuel cell stack.

As shown in FIGS. 1 and 2, a fuel cell stack 10 according to a first embodiment of the present invention includes a stack body 14 formed by stacking a plurality of fuel cells 12 in a vertical direction indicated by an arrow A. At one end (lower end) of the stack body 14 in the stacking direction, a first terminal plate 16a is provided. A first insulating plate 18a is stacked on the first terminal plate 16a, and a first end plate (the other end plate) 20a is provided on the first insulating plate 18a.

As shown in FIGS. 1 to 4, at an upper end (other end) of the stack body 14 in the stacking direction, a second terminal plate 16b is provided. A second insulating plate 18b is stacked on the second terminal plate 16b, a second end plate (one end plate) 20b is stacked on the second insulating plate 18b, and a pressure application adjustment device 22 is stacked on the second end plate 20b. The pressure application adjustment device 22 includes a load measurement mechanism 24 and a pressure applying mechanism 26. The stack body 14 may be formed by stacking the fuel cells 12 in a horizontal direction indicated by an arrow B or an arrow C.

Figure 5:
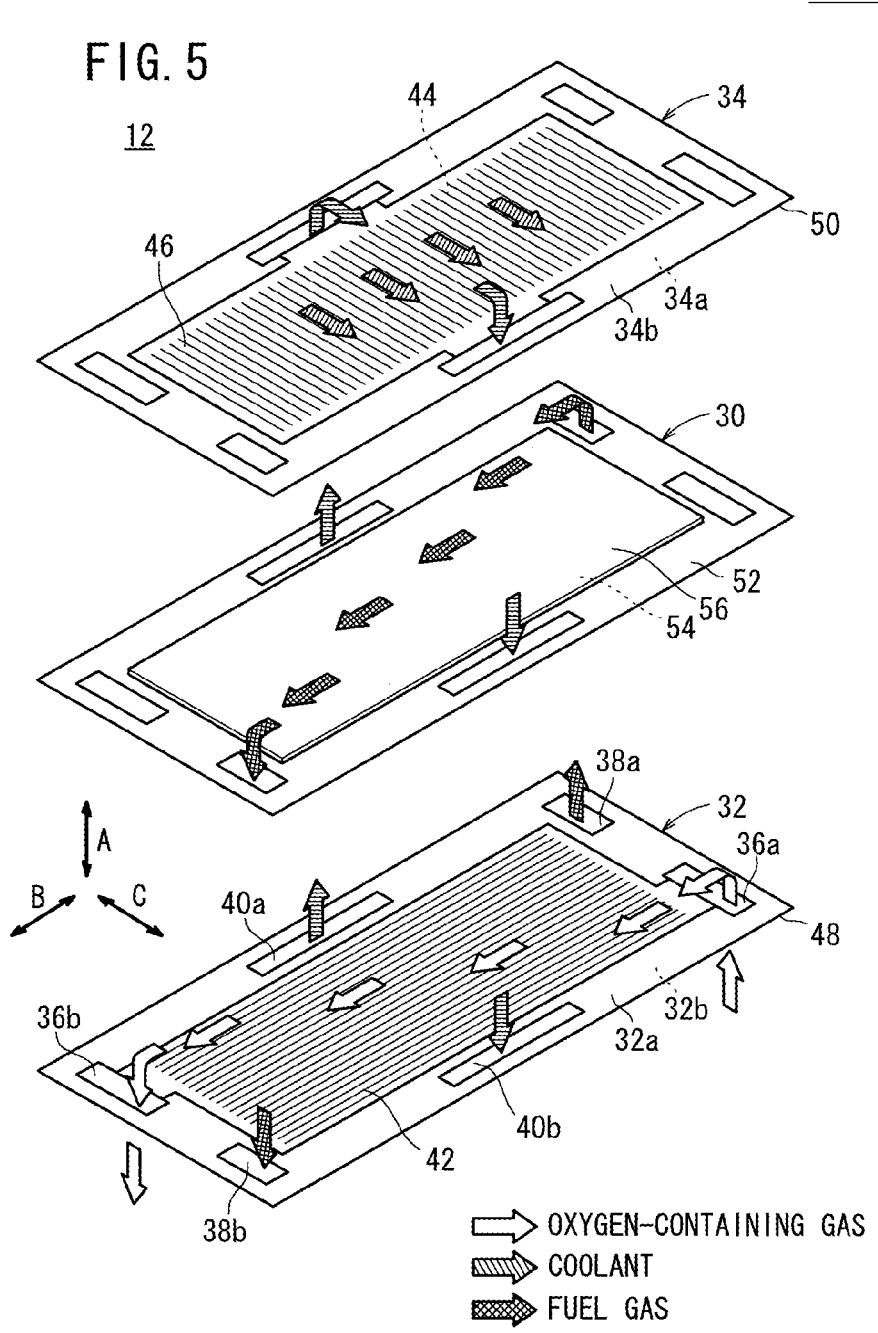
FIG. 5 is an exploded perspective view showing main components of a fuel cell of a fuel cell stack.

As shown in FIG. 5, the fuel cell 12 includes a membrane electrode assembly 30 and first and second rectangular separators 32, 34 sandwiching the membrane electrode assembly 30. The first and second separators 32, 34 are metal separators of, e.g., steel plates, stainless steel plates, aluminum plates, or plated steel plates. Alternatively, the first and second separators 32, 34 are carbon separators.

At one end of the fuel cells 12 in a horizontal direction indicated by the arrow B in FIG. 5, an oxygen-containing gas supply passage 36a for supplying an oxidant gas such as an oxygen-containing gas and a fuel gas supply passage 38a for supplying a fuel gas such as a hydrogen-containing gas are arranged in a horizontal direction indicated by the arrow C. The oxygen-containing gas supply passage 36a and the fuel gas supply passage 38a extend through the fuel cells 12 in the direction indicated by the arrow A.

At the other end of the fuel cells 12 in the direction indicated by the arrow B, a fuel gas discharge passage 38b for discharging the fuel gas, and an oxygen-containing gas discharge passage 36b for discharging the oxygen-containing gas are arranged in the direction indicated by the arrow C. The fuel gas discharge passage 38b and the oxygen-containing gas discharge passage 36b extend through the fuel cells 12 in the direction indicated by the arrow A.

At both ends of the fuel cells 12 in the direction indicated by the arrow B, i.e., in the long sides of the fuel cells 12, a coolant supply passage 40a for supplying a coolant and a coolant discharge passage 40b for discharging the coolant are provided.

The first separator 32 has an oxygen-containing gas flow field 42 on its surface 32a facing the membrane electrode assembly 30. The oxygen-containing gas flow field 42 is connected to the oxygen-containing gas supply passage 36a and the oxygen-containing gas discharge passage 36b.

The second separator 34 has a fuel gas flow field 44 on its surface 34a facing the membrane electrode assembly 30. The fuel gas flow field 44 is connected to the fuel gas supply passage 38a and the fuel gas discharge passage 38b.

A coolant flow field 46 is formed between a surface 32b of the first separator 32 of one of the adjacent fuel cells 12 and a surface 34b of the second separator 34 of the other of the adjacent fuel cells 12. The coolant flow field 46 is connected between the coolant supply passage 40a and the coolant discharge passage 40b.

A first seal member 48 is formed integrally with the surfaces 32a, 32b of the first separator 32. Alternatively, a member separate from the first separator 32 may be provided as the first seal member 48 provided on the surfaces 32a, 32b of the first separator 32. A second seal member 50 is formed integrally with the surfaces 34a, 34b of the second separator 34. Alternatively, a member separate from the second separator 34 may be provided as the second seal member 50 provided on the surfaces 34a, 34b of the second separator 34.

Each of the first and second seal members 48, 50 is made of seal material, cushion material, or packing material such as an EPDM rubber, an NBR, a fluoro rubber, a silicone rubber, a fluorosilicone rubber, a butyl rubber, a natural rubber, a styrene rubber, a chloroprene rubber, or an acrylic rubber.

The membrane electrode assembly 30 includes a cathode 54, an anode 56, and a solid polymer electrolyte membrane 52 interposed between the cathode 54 and the anode 56. The solid polymer electrolyte membrane 52 is formed by impregnating a thin membrane of perfluorosulfonic acid with water, for example.

Each of the cathode 54 and the anode 56 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 54 and the electrode catalyst layer of the anode 56 are fixed to both surfaces of the solid polymer electrolyte membrane 52, respectively.

As shown in FIGS. 1 and 2, a pair of tightening members 60 of metal (or resin) are bridged between the first and second end plates 20a, 20b of metal (or resin) such that the distance between the first and second end plates 20a, 20b is kept constant. For example, the tightening member 60 is an elongated aluminum plate, and the end plates 20a, 20b are aluminum plates. One tightening member 60 is provided along each of the long sides of the fuel cell stack 10 (each of the long sides of the first and second plates 20a, 20b). The tightening member 60 has a symmetrical shape.

The tightening member 60 is bent at one end thereof on the second end plate 20b side to extend along a surface of the second end plate 20b, so as to form a bent portion 62 coupled to the pressure application adjustment device 22, namely to the pressure applying mechanism 26. Further, the tightening member 60 has a wide portion 64 provided at the other end thereof on the first end plate 20a side. The wide portion 64 has a width extended toward a long side of the first end plate 20a. The bent portion 62 is bent substantially 90° with respect to a body 66 of the tightening member 60.

The body 66 of the tightening member 60 has a constant width between long sides of the pair of end plates 20a, 20b. Further, the tightening member 60 includes a pair of reinforcement plates 68 at the other end of the body 66. The reinforcement plates 68 extend away from each other toward both ends of the long side of the first end plate 20a to form the wide portion 64.

The width of the body 66 is smaller than the dimension of the long sides of the first and second end plates 20a, 20b. The center of the width of the body 66 is substantially in alignment with the center of the long sides of the first and second end plates 20a, 20b.

A pair of the reinforcement plates 68 are spaced away from each other downwardly, at lower positions of the body 66. The lower ends of the reinforcement plate 68 are coupled to the lower end of the body 66 through a lateral frame 70. The width of the lateral frame 70 is larger than the width of the body 66. At least one rib 72 is provided in the body 66 and in the pair of reinforcement plates 68. A rib may be provided between the body 66 and in the pair of reinforcement plates 68. Further, a rib may be provided between the body 66 and the bent portion 62.

As shown in FIG. 2, the body 66 and the pair of reinforcement plates 68 have screw holes 78. Screws 76 inserted into holes 74 formed along the long side of the first end plate 20a are screwed into the screw holes 78. Thus, the body 66 and the pair of reinforcement plates 68 are fixed to the first end plate 20a. The body 66 and the pair of reinforcement plates 68 may be fixed by latching the body 66 and the reinforcement plates 68 from the side surface to the bottom surface of the first end plate 20a.

The bent portion 62 has a pair of (or three or more) female thread portions 80 extending vertically. The female thread portions 80 are spaced from one another by a predetermined interval, and screw holes 80a extend through the bent portion 62 in the vertical direction.

As shown in FIG. 2, the first end plate 20a include manifolds 82a to 82f connected to the oxygen-containing gas supply passage 36a, the fuel gas supply passage 38a, the coolant supply passage 40a, the oxygen-containing gas discharge passage 36b, the fuel gas discharge passage 38b, and the coolant discharge passage 40b, respectively. The manifolds 82a to 82f extend to the outside.

Figure 3:
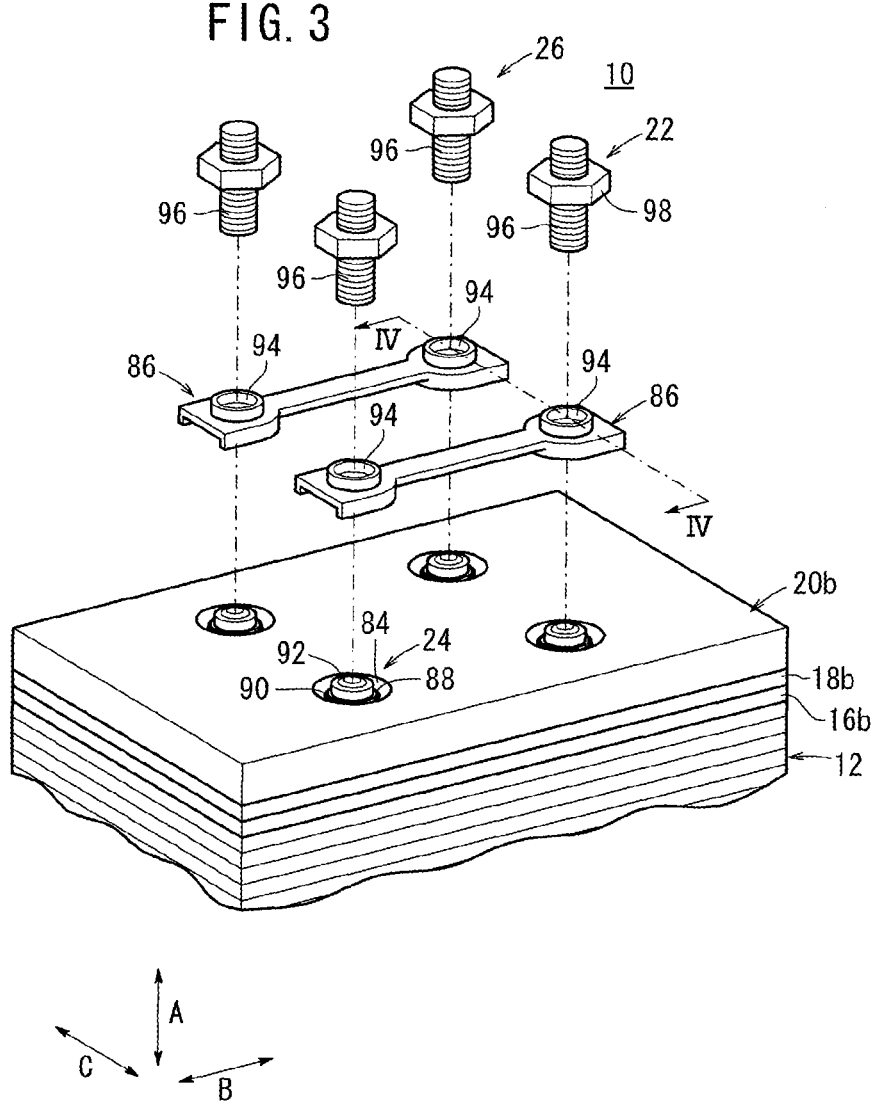
FIG. 3 is a partial exploded perspective view showing the fuel cell stack.

As shown in FIG. 3, the second end plate 20b is a flat plate. For example, recesses 84 each having a cylindrical shape is formed at four positions in the second end plate 20b.

Figure 4:
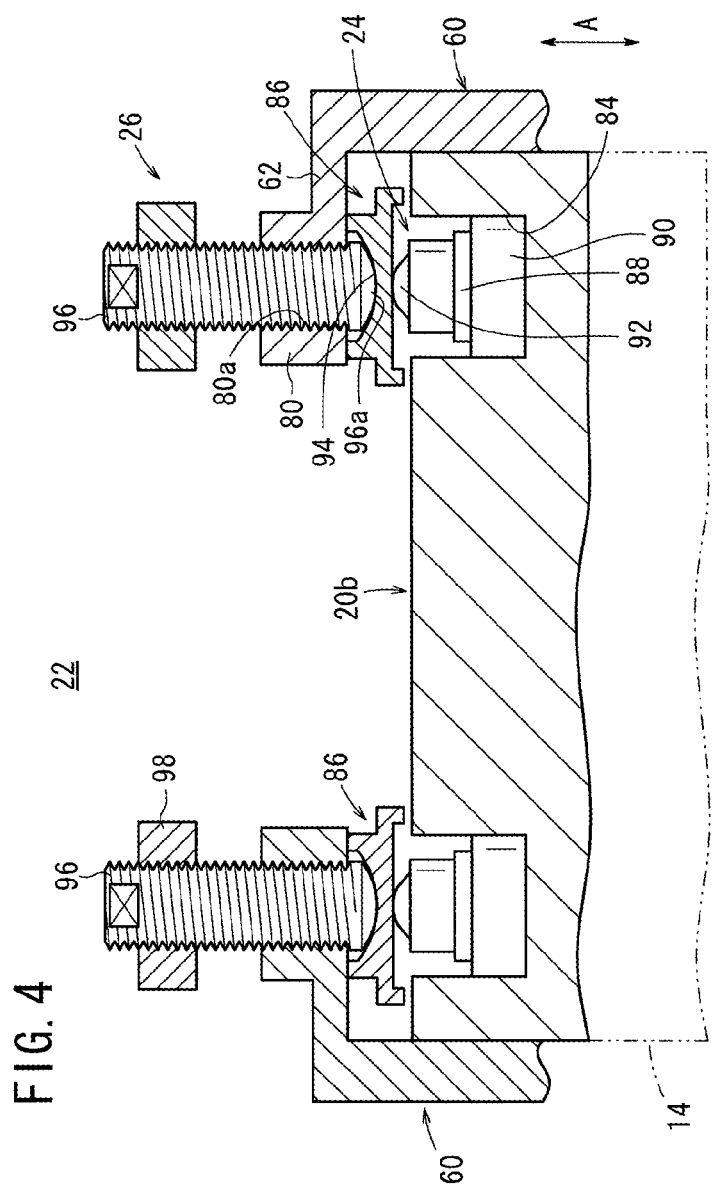
FIG. 4 is a cross sectional view taken along a line IV-IV in FIG. 3.

As shown in FIGS. 3 and 4, the load measurement mechanism 24 includes a pair of coupling members 86, and load sensors such as load cells 88 placed in the recesses 84. Instead of the pair of coupling members 86, for example, a pair of coupling members (not shown) coupled together into a single frame shape may be used.

Presser members 90 are attached to the load cells 88, and the load cells 88 are placed in the recesses 84. A spherical receiver 92 is provided on the load cell 88. At both ends of the coupling member 86, spherical recesses 94 are formed at positions corresponding to (at positions coaxial with) the respective spherical receivers 92.

The pressure applying mechanism 26 includes a plurality of, e.g., four load adjustment bolts 96. Each of the load adjustment bolts 96 is screwed into the screw hole 80a formed in the female thread portion 80. Further, spherical front end portions 96a are placed in the spherical recesses 94. The center of each load adjustment bolt 96 is coaxial with the center of each load cell 88. The load adjustment bolt 96 is screwed into a rotation stop nut 98.

Operation of the fuel cell stack 10 will be described below.

Firstly, as shown in FIG. 5, an oxygen-containing gas is supplied to the oxygen-containing gas supply passage 36a, and a fuel gas such as a hydrogen-containing gas is supplied to the fuel gas supply passage 38a. Further, a coolant such as pure water, ethylene glycol or oil is supplied to the coolant supply passage 40a.

Thus, the oxygen-containing gas is supplied from the oxygen-containing gas supply passage 36a to the oxygen-containing gas flow field 42 of the first separator 32. The oxygen-containing gas moves in the direction indicated by the arrow B, and the oxygen-containing gas is supplied to the cathode 54 of the membrane electrode assembly 30.

The fuel gas from the fuel gas supply passage 38a is supplied into the fuel gas flow field 44 of the second separator 34. The fuel gas moves in the direction indicated by the arrow B, and the fuel gas is supplied to the anode 56 of the membrane electrode assembly 30.

Thus, in the membrane electrode assembly 30, the oxygen-containing gas supplied to the cathode 54 and the fuel gas supplied to the anode 56 are consumed in the electrochemical reactions at catalyst layers of the cathode 54 and the anode 56 for generating electricity.

The oxygen-containing gas supplied to but unconsumed at the cathode 54 is discharged along the oxygen-containing gas discharge passage 36b in the direction indicated by the arrow A. On the other hand, the fuel gas supplied to but unconsumed at the anode 56 is discharged along the fuel gas discharge passage 38b in the direction indicated by the arrow A.

The coolant supplied into the coolant supply passage 40a flows into the coolant flow field 46 between the first and second separators 32, 34 formed between the first and second separators 32, 34, and the coolant flows in the direction indicated by the arrow C. After the coolant cools the membrane electrode assembly 30, the coolant is discharged into the coolant discharge passage 40b.

At the time of assembling the fuel cell stack 10, an initial load is applied to the fuel cell stack 10. Seals in the fuel cell stack 10 such as the first and second seal members 48, 50, the solid polymer electrolyte membrane 52, and carbon papers may be fatigued over time due to contraction in the use for the power generation of the fuel cell stack 10.

In the fuel cell stack 10, the components between the first and second end plates 20a, 20b are held together using the two tightening members 60, and the distance between the first and second end plates 20a, 20b are kept constant. Therefore, the tightening load applied to the fuel cell stack 10 is decreased over time due to the use of the fuel cell stack 10.

Thus, as show in FIG. 4, the load adjustment bolts 96 of the pressure applying mechanism 26 is screwed into the screw holes 80a of the female thread portions 80 of the second end plate 20b. Thus, the spherical front end portions 96a of the load adjustment bolts 96 press the bottom surfaces of the spherical recesses 94 of the coupling members 86 toward the stack body 14.

In the structure, the load cells 88 attached to the coupling members 86 coaxially with the load adjustment bolts 96 presses the second end plate 20b toward the stack body 14 through the presser members 90. Thus, a tightening load is applied to the stack body 14 through the second end plate 20b.

In this manner, each of the load cells 88 applies the additional tightening load to the stack body 14. In this state, the value of the additional tightening load can be detected correctly. Further, because the additional load can be applied during detection, a uniform load can be applied to the entire surface of the stack body 14.

In this manner, it becomes possible to accurately detect distribution of the load in the surface of the stack body 14. Thus, the pressure applying mechanism 26 can adjust the tightening load easily and reliably such that the load applied to the stack body 14 has the uniform distribution in the surface of the stack body 14. The load adjustment bolts 96 may directly press the second end plate 20b without using the load cells 88.

In the first embodiment, the tightening member 60 includes the bent portion 62 bent to extend along the surface of the second end plate 20b, and coupled to the pressure applying mechanism 26 of the pressure application adjustment device 22. Specifically, the bent portion 62 includes a pair of the female thread portions 80 extending vertically, and load adjustment bolts 96 of the pressure applying mechanism 26 are screwed into the screw holes 80a formed in the female thread portions 80.

Thus, no plate dedicated to attach the pressure applying mechanism 26 is required. The number of components is reduced, and reduction in the size and weight is achieved. Further, structure of the fuel cell stack 10 is simplified.

Further, the load adjustment bolts 96 of the pressure applying mechanism 26 press the coupling members 86 coaxially with the load cells 88. Therefore, the additional tightening load by the load adjustment bolts 96 is more directly transmitted to the load cells 88. That is, the additional tightening load by the load adjustment bolts 96 is more directly transmitted to the stack body 14.

Further, the load applied to the tightening members 60 by the additional tightening load of the load adjustment bolts 96 is small. Therefore, the rigidity required for the tightening member 60 can be small, and reduction in the size and weight is achieved. Further, structure of the fuel cell stack 10 is simplified. Moreover, the tightening member 60 has at least one rib 72. Therefore, reduction in the weight of the tightening member 60 is achieved, and improvement in the strength of the tightening member 60 is achieved easily.

Further, the tightening member 60 on the first end plate 20a side includes the wide portion 64 extended and widened toward the first end plate 20a. In the structure, the wide portion 64 is coupled to the first end plate 20a in a relatively wide range in a longitudinal direction of the first end plate 20a. Thus, it becomes possible to prevent concentration of the stress on the first end plate 20a.

Accordingly, with compact and lightweight structure, it becomes possible to apply the optimum tightening load to the fuel cells 12 in the stacking direction.

Figure 6:
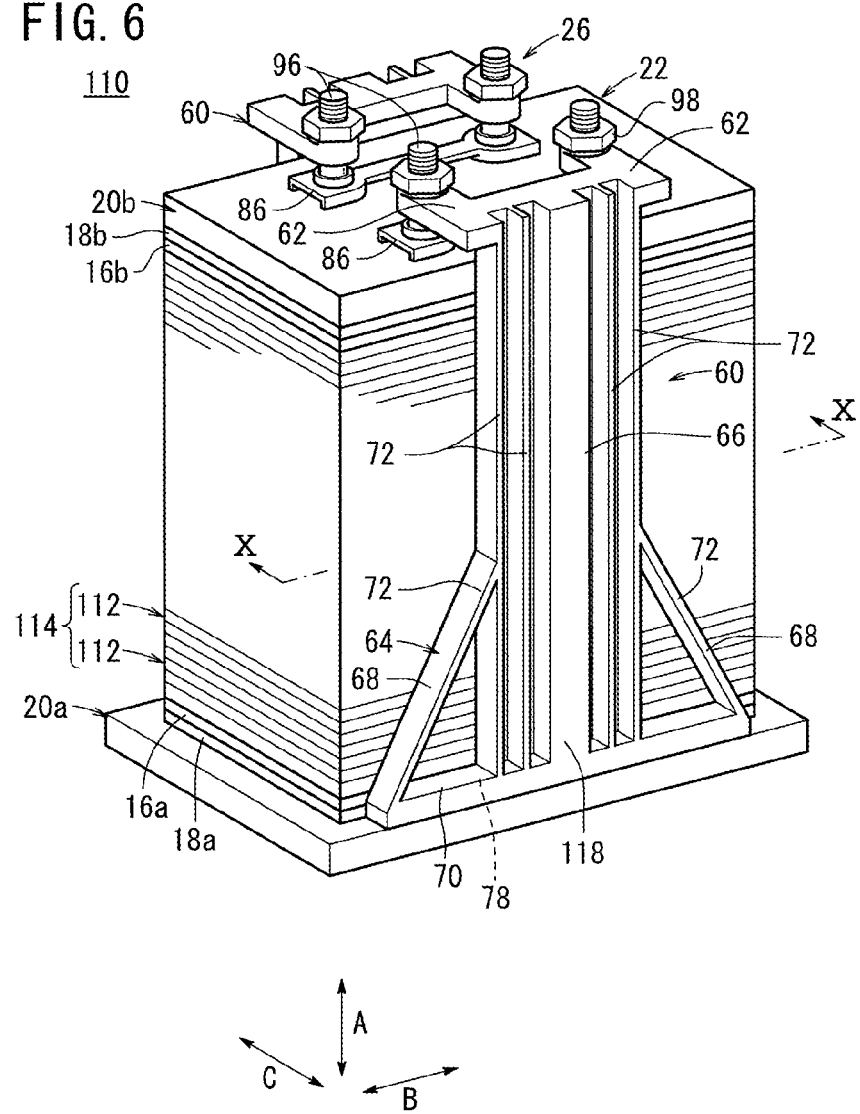
FIG. 6 is a perspective view schematically showing a fuel cell stack according to a second embodiment of the present invention.

FIG. 6 is a perspective view schematically showing a fuel cell stack 110 according to a second embodiment of the present invention. The constituent elements that are identical to those of the fuel cell stack 10 according to the first embodiment are labeled with the same reference numeral, and description thereof is omitted.

Figure 7:
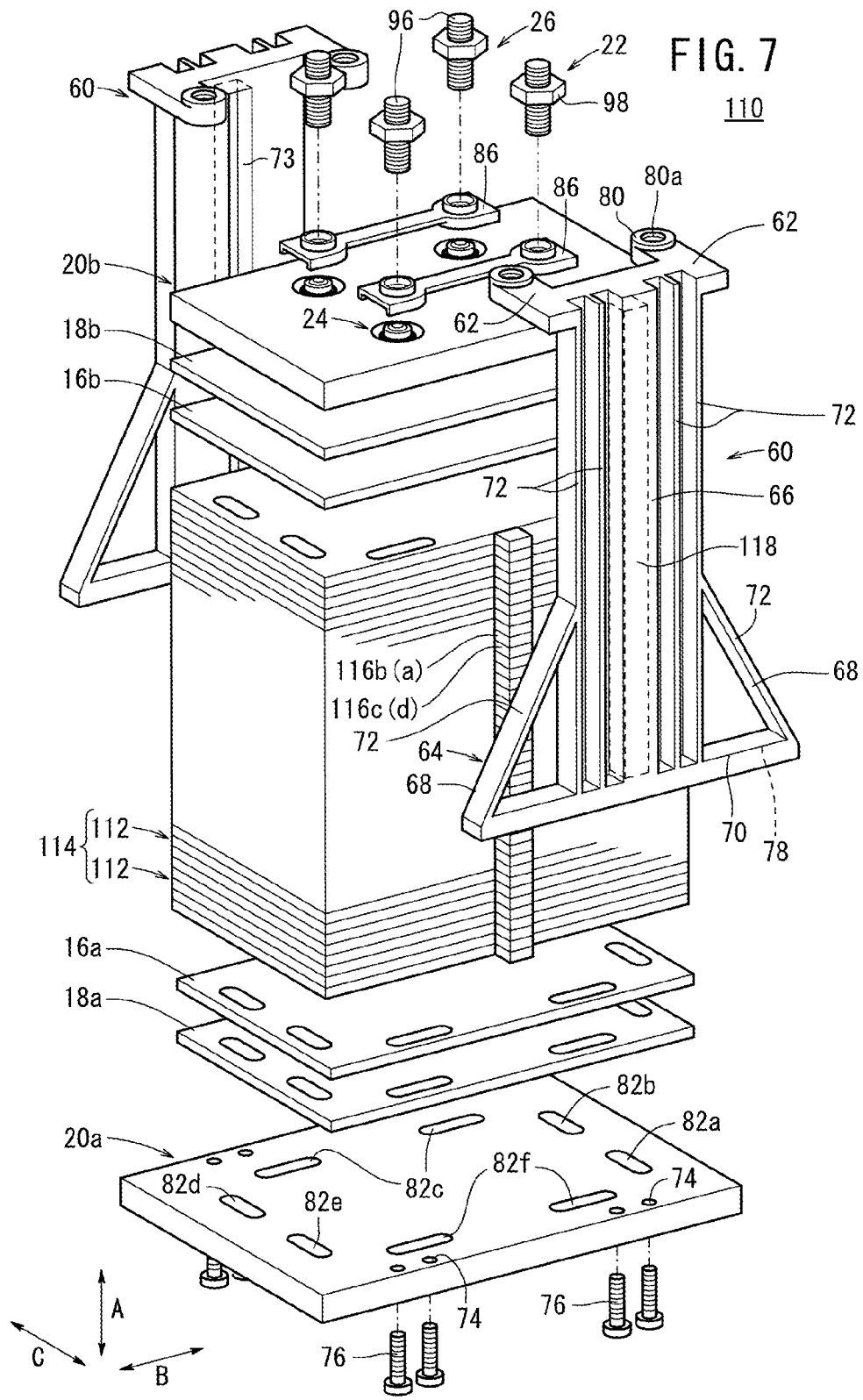
FIG. 7 is an exploded perspective view showing main components of a fuel cell stack.
Figure 8:
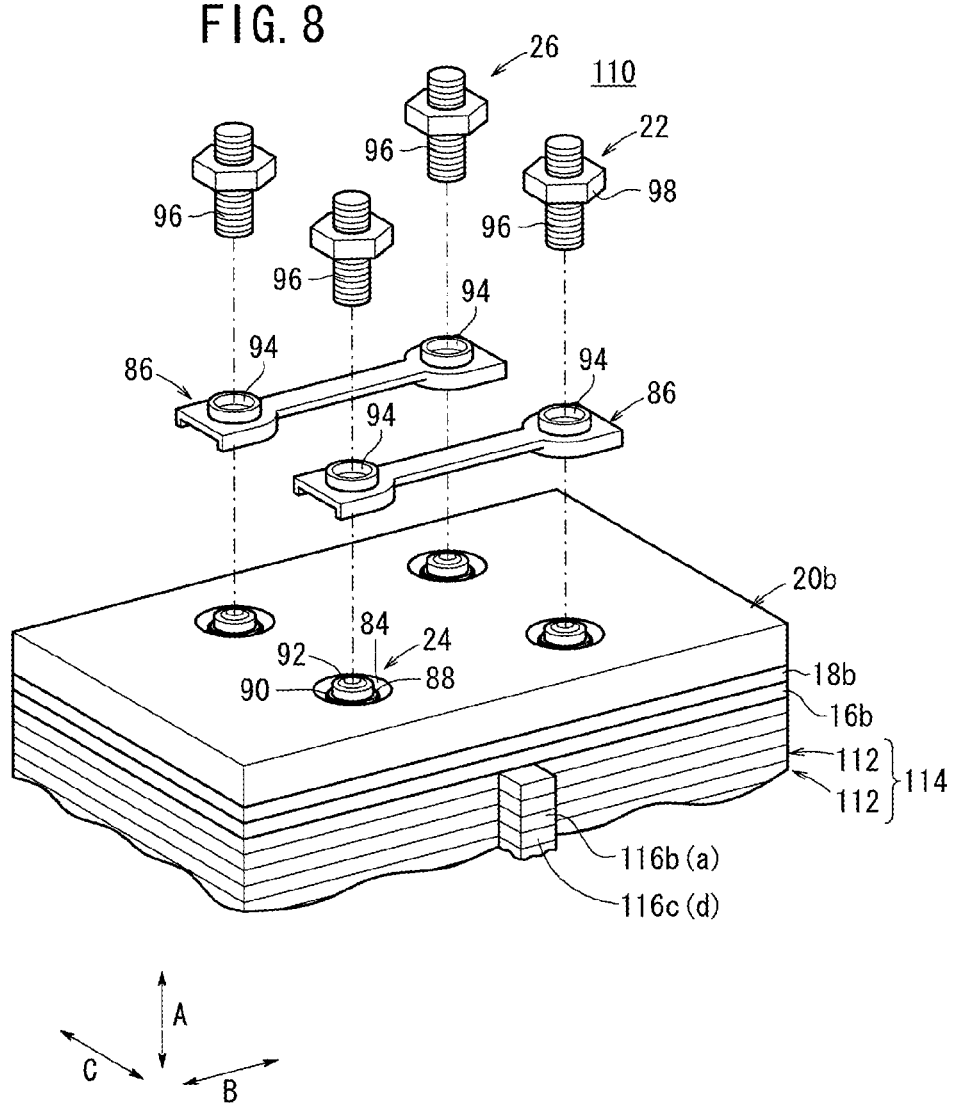
FIG. 8 is a partial exploded perspective view showing main components of the fuel cell stack.
Figure 9:
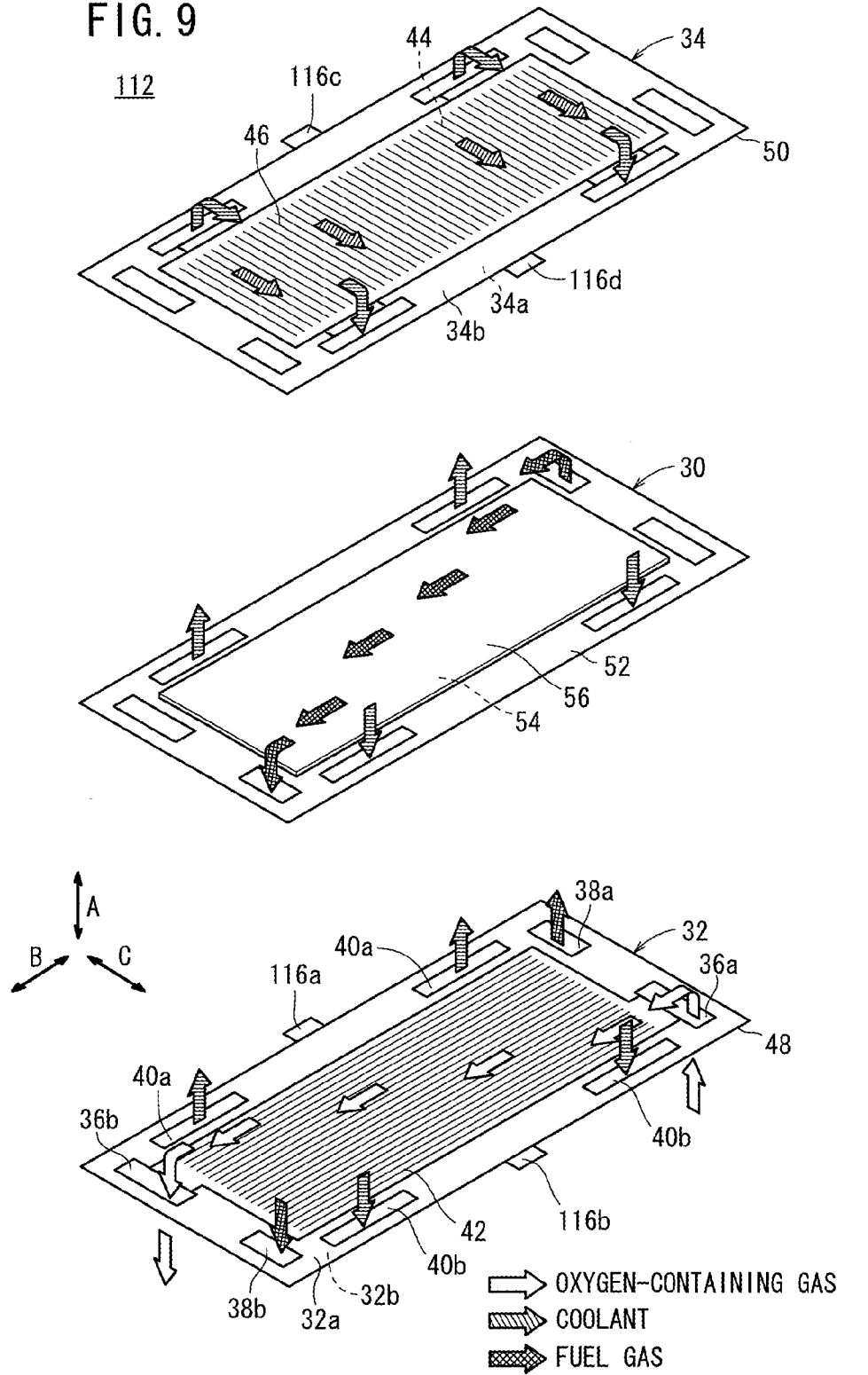
FIG. 9 is an exploded perspective view showing main components of a fuel cell of the fuel cell stack.

As shown in FIGS. 6 to 8, the fuel cell stack 110 includes a stack body 114 formed by stacking a plurality of fuel cells 112 in a vertical direction indicated by an arrow A. As shown in FIG. 9, protrusions 116a, 116b protruding outwardly are formed between a pair of coolant supply passages 40a and a pair of coolant discharge passages 40b, i.e., at substantially the center in the longitudinal direction of the first separator 32.

Protrusions 116c, 116d protruding outwardly are formed between the pair of coolant supply passages 40a and the pair of coolant discharge passages 40b, i.e., at substantially the center in the longitudinal direction of the second separator 34. Alternatively, the protrusions may be formed only on one of the first and second separators 32, 34. For example, the protrusions 116a to 116d are made of resin material. The protrusions 116a to 116d may be formed integrally with the first and second separators 32, 34. Alternatively, the protrusions 116a to 116d as separate members may be joined to the first and second separators 32, 34. The load cells 88 are not necessarily required in the second embodiment.

Figure 10:
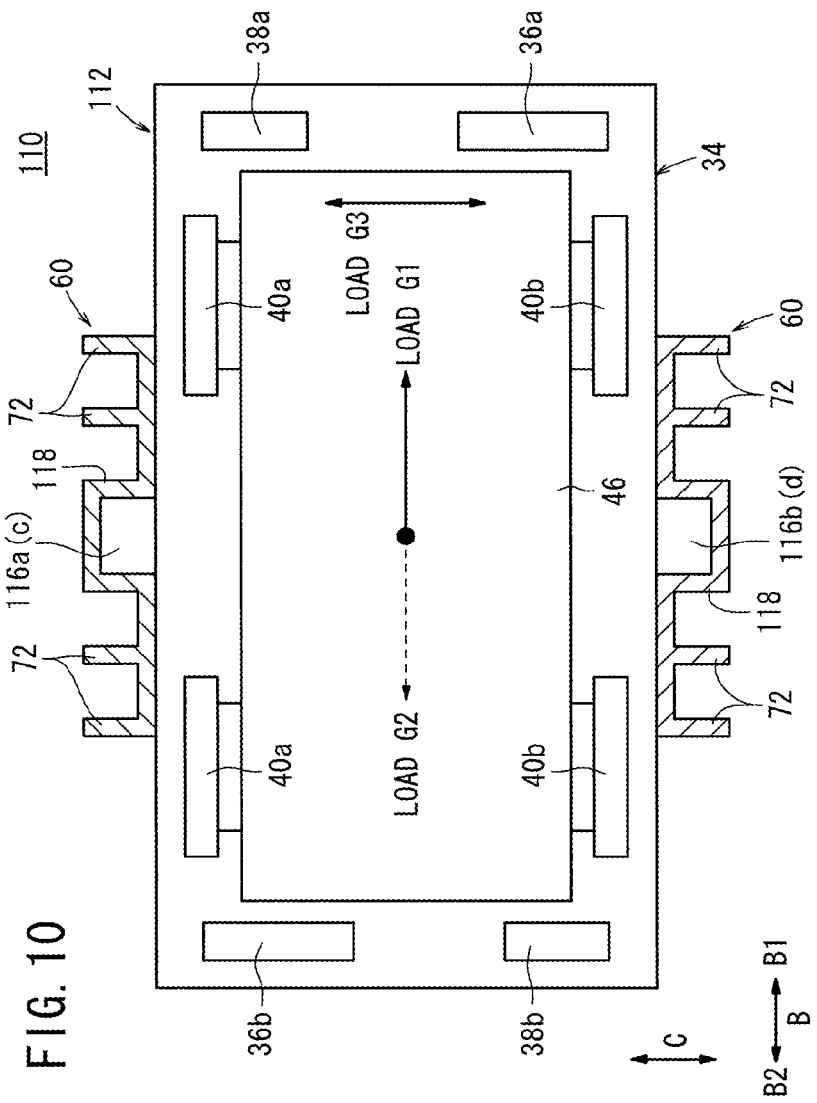
FIG. 10 is a cross sectional view showing the fuel cell stack, taken along a line X-X in FIG. 6.
Figure 11:
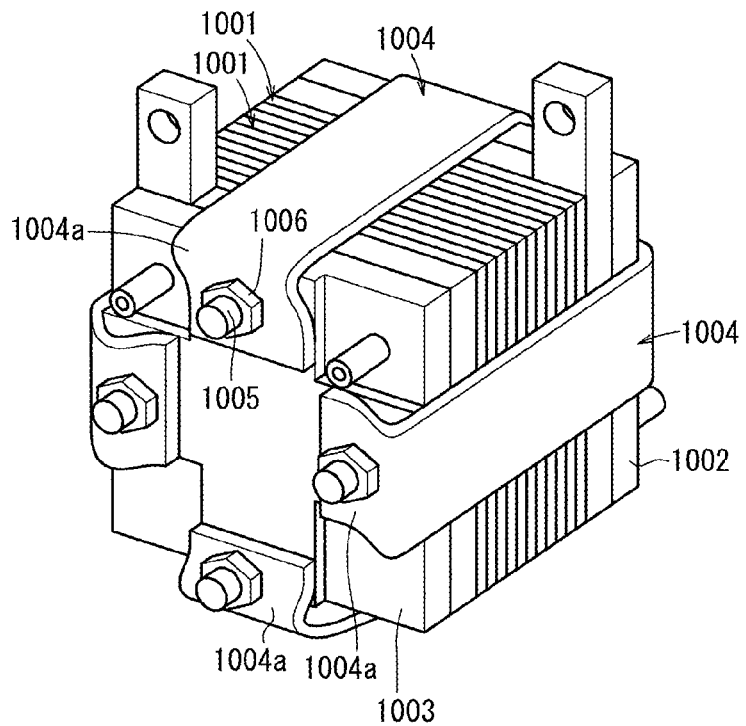
FIG. 11 is a perspective view showing a fuel cell stack disclosed in Japanese Laid-Open Patent Publication No. 2004-362940.
Figure 12:
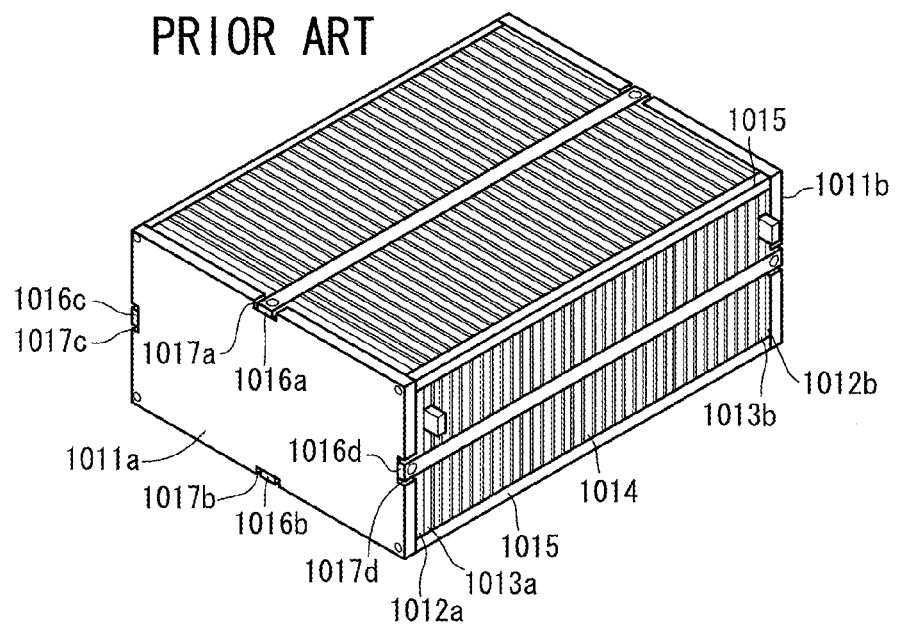
FIG. 12 is a perspective view showing a fuel cell stack disclosed in Japanese Laid-Open Patent Publication No. 2009-070674.

As shown in FIG. 7, a fitting portion 118 is formed in the body 66, in parallel with the reinforcement ribs 72, i.e., the fitting portion 118 extends in the stacking direction. The fitting portion 118 is formed to expand to the outside of the fuel cells 112. As shown in FIG. 10, in one of the tightening members 60, the protrusions 116a, 116c of the fuel cells 112 and the fitting portion 118 are fitted together. In the other of the tightening members 60, the fitting portion 118 and the protrusions 116b, 116d of the fuel cells 112 are fitted together.

Conversely to the above structure, recesses are formed instead of the protrusions 116a to 116d of the fuel cell 112, and protrusions may be formed instead of the fitting portions 118 of the tightening member 60.

In the fuel cell stack 110, a pair of tightening members 60 are bridged between the first and second end plates 20a, 20b. Therefore, when a load in the stacking direction is applied to the fuel cell stack 110, the load can be received suitably by the pair of tightening members 60.

Further, the tightening members 60 have the fitting portions 118, and the fitting portions 118 are fitted to the protrusions 116a, 116c or the protrusions 116b, 116d formed on both side surfaces of the stack body 114 in the stacking direction, specifically on both long sides of the fuel cells 112.

Thus, as shown in FIG. 10, when a load (impact) G1 is applied to the fuel cell stack 110 in one longitudinal direction indicated by an arrow B1, the fitting portions 118 of one of the tightening members 60 and protrusions 116a, 116c, and the fitting portions 118 of the other of the tightening members 60 and the protrusions 116b, 116d can receive the load G1 suitably.

Further, likewise, when a load (impact) G2 is applied to the fuel cell stack 110 in the other longitudinal direction indicated by an arrow B2, the fitting portions 118 and protrusions 116a, 116c and the protrusions 116b, 116d can receive the load G2 suitably.

Further, when a load (impact) G3 is applied to the fuel cell stack 110 in a lateral direction indicated by the arrow C, the load G3 can be received suitably by the abutment of the fuel cell stack 110 against the pair of the tightening members 60.

In the fuel cell stack 110, though one tightening member 60 is provided in each of the long sides of the fuel cell stack 110, the present invention is not limited in this respect. For example, one tightening member 60 may be provided in each of the short sides of the fuel cell stack 10 as well.

In the structure, in the second embodiment, the number of components is reduced effectively. With simple structure, the external load applied to the fuel cells 112 is received reliably. Thus, even if an impact is applied to the stack body 114, the stack body 114 is held suitably, and it is possible to prevent degradation of the sealing performance.

While the invention has been particularly shown and described with reference to preferred embodiments, it will be understood that variations and modifications can be effected thereto by those skilled in the art without departing from the invention as defined by the appended claims.

What is claimed is:

1. A fuel cell stack including a stack body formed by stacking a plurality of fuel cells in a stacking direction and a pair of end plates provided at both ends in the stacking direction, the fuel cells each being formed by stacking a membrane electrode assembly and a rectangular separator, the membrane electrode assembly including a pair of electrodes and an electrolyte membrane interposed between the pair of electrodes, long sides of the pair of end plates being fixed together by tightening members, and
  a pressure application adjustment device capable of adjusting a tightening load applied to the stack body being provided in one of the end plates, wherein the tightening members each includes:
  one end as a bent portion provided at the one of the end plates, the bent portion being bent in a direction along a surface of the one of the end plates, and coupled to the pressure application adjustment device;
  another end as a wide portion provided at another one of the end plates, the wide portion having a width extended toward the long side of the other of end plates
  a body having a constant width between the long sides of the pair of end plates; and
  a pair of reinforcement plates at the other end of the tightening member, the reinforcement plates extending away from each other toward both ends of the long side of the other of the end plates to form the wide portion.

2. The fuel cell stack according to claim 1, wherein the pressure application adjustment device includes:
  a load measurement mechanism having a plurality of load sensors coupled to the one of end plates; and
  a pressure applying mechanism having a plurality of load adjustment bolts screwed into screw holes formed in the bent portion to press the load measurement mechanism toward the stack body for applying a tightening load to the stack body through the plurality of load sensors, and
  wherein the load adjustment bolts are arranged on the tightening member so as to be positioned coaxially with the load sensors.

3. A fuel cell stack including a stack body formed by stacking a plurality of fuel cells in a stacking direction and a pair of end plates provided at both ends in the stacking direction, the fuel cells each formed by stacking a membrane electrode assembly and a rectangular separator, the membrane electrode assembly including a pair of electrodes and an electrolyte membrane interposed between the pair of electrodes, long sides of the pair of end plates being fixed together by tightening members,
  a protrusion being provided on each of both side surfaces of the stack body at a substantially center position in a longitudinal direction of the rectangular separator where the tightening members are provided; and
  the tightening members each including a fitting portion fitted to the protrusion.

4. The fuel cell stack according to claim 3, wherein the tightening member includes a reinforcement rib adjacent to the fitting portion, the reinforcement rib extending in the stacking direction.

5. The fuel cell stack according to claim 3, wherein the tightening member includes:
  one end as a bent portion provided at one of the end plates, the bent portion being bent in a direction along a surface of the one of the end plates; and
  another end as a wide portion provided at another one of the end plates, the wide portion having a width extended toward the long side of the other of end plates.

6. The fuel cell stack according to claim 5, wherein
  a pressure application adjustment device capable of adjusting a tightening load applied to the stack body is provided in the one of the end plates, the pressure application adjustment device including:
  a load measurement mechanism having a plurality of load sensors coupled to the one of end plates; and
  a pressure applying mechanism having a plurality of load adjustment bolts screwed into screw holes formed in the bent portion to press the load measurement mechanism toward the stack body for applying a tightening load to the stack body through the plurality of load sensors, and
  wherein the load adjustment bolts are arranged on the tightening member so as to be positioned coaxially with the load sensors.

* * * * *